(12) United States Patent  
Cameron (10) Patent No.: US 6,591,777 B2
(45) Date of Patent: Jul. 15, 2003

(54) APPARATUS FOR TURNING-OVER A STREAM OF PRODUCT AND COATING THE PRODUCT

(75) Inventor: Carl Dale Cameron, Rossiter, PA (US)

(73) Assignee: FMC Technologies, Inc., Chicago, IL (US)

( * ) Notice: Subject to any disclaimer, the term of this patent is extended or adjusted under 35 U.S.C. 154(b) by 39 days.

(21) Appl. No.: 09/826,722

(22) Filed: Apr. 5, 2001

(65) Prior Publication Data

US 2002/0144650 A1 Oct. 10, 2002

(51) Int. Cl.[7] .............................................. B05C 19/04
(52) U.S. Cl. ............................ 118/13; 118/16; 118/19; 118/24; 118/308; 118/310; 99/494
(58) Field of Search ............................... 118/13, 16, 19, 118/23, 24, 303, 308, 310; 426/289; 99/494; 427/180, 420

(56) References Cited

U.S. PATENT DOCUMENTS

| | | | | |
|---|---|---|---|---|
| 2,573,835 | A | * 11/1951 | Dyar | 118/206 |
| 3,666,184 | A | * 5/1972 | Beshgetoor | 239/512 |
| 4,210,074 | A | * 7/1980 | Laughman | 99/494 |
| 4,270,486 | A | * 6/1981 | Leverenz | 118/679 |
| 5,054,652 | A | 10/1991 | Oshima et al. | |
| 5,846,324 | A | 12/1998 | Marshall et al. | |

OTHER PUBLICATIONS

FMC Corporation brochure, *Syntron BF–4 Vibrating Feeder*, 2000, 5 pages.
FMC Corporation brochure, *FMC The First Name In Food Handling Systems*, 1995, 18 pages.
FMC Corporation brochure, *Baking & Snack*, June 1999, 4 pages.
FMC Corporation brochure, *If Your Packaging Line Resembles An Obstacle Course, Let FMC Help Clear The Way*, 1 page.
Allen MacHinrey™ brochure, *VF™ Vibrating Conveyor*, 2001, 2 pages.

* cited by examiner

Primary Examiner—Laura Edwards
(74) Attorney, Agent, or Firm—Wood, Phillips, Katz, Clark & Mortimer (57) ABSTRACT

An apparatus for spreading particles, such as seasoning, on both sides of products conveyed in a product stream includes first and second conveyors arranged at different elevations, and a particle dispensing device arranged above a vertical overlap between the two conveyors such that particles dispensed by the spreading device falls on the product stream on the first conveyor and the product stream on the second conveyor. A turning apparatus is arranged between an outlet of the first conveyor and an inlet of the second conveyor such that the product stream is turned over as it is being deposited from the first conveyor onto the second conveyor. The turning apparatus includes a discharge lip on the outlet of the first conveyor, and a curved turning wall arranged spaced from the discharge lip.

17 Claims, 6 Drawing Sheets

APPARATUS FOR TURNING-OVER A STREAM OF PRODUCT AND COATING THE PRODUCT

TECHNICAL FIELD OF THE INVENTION

The invention relates to apparatus used to coat or treat two sides of a stream of articles. Particularly, the invention relates to devices used for applying seasoning onto both sides of a stream of food product.

BACKGROUND OF THE INVENTION

In the production of some snack foods, a stream of snack food product is coated with a seasoning. One current method of applying seasoning to a stream of snack food product includes tumbling the food product within a drum while dispensing seasoning from an elevated trough within the drum, such as disclosed in U.S. Pat. No. 5,846,324.

Another method of applying seasoning to a stream of snack food product is to pass the food product along a first conveyor beneath a seasoning-dispensing device such as a sprayer or a spreader-feeder, and to dribble-feed, or spray, seasoning onto the product. This method is effective for one-sided coating. To apply seasoning to the second side of the food product requires a second conveyor beneath the seasoning-dispensing device and a seasoning-dispensing device above the second conveyor. The product is dropped from the first conveyor to the second conveyor.

Turning the product from the first side to the second side is achieved during the drop in a random manner, thus the second side exposure of the food product to the seasoning varies greatly.

SUMMARY OF THE INVENTION

The invention provides a compact spreader apparatus that applies a coating of particles on both sides of a stream of articles. Particularly, the invention provides a compact seasoning spreader apparatus that applies a coating of seasoning on both sides of food product conveyed in a stream.

The invention provides a cost effective and compact apparatus for effectively turning a product steam over 180 degrees.

The spreader apparatus includes a first conveyor or feeder arranged at a first elevation, and a second conveyor or feeder arranged at a second, lower elevation. The first conveyor includes a first inlet and a first outlet. The second conveyor includes a second inlet and a second outlet. The first outlet is arranged above the second inlet of the second conveyor. A turning apparatus is arranged between the first and second conveyors. Product conveyed on the first conveyor exits the first conveyor at the first outlet, is turned over 180 degrees by the turning apparatus, and deposits on the second inlet end of the second conveyor. The second conveyor conveys the product to the second outlet where the product exits the spreader apparatus.

A particle dispensing device is arranged above both the first and second conveyors. Particles, such as seasoning, delivered by the spreader device are dispersed onto a first side of the stream of product on the first conveyor, and on a second side of the stream of product on the second conveyor. Preferably, the conveyors are arranged at a 90° angle to each other, in plan.

The turning apparatus can include a discharge lip that extends from the first outlet obliquely downwardly toward the second conveyor, and a curved turning plate or wall, spaced from the discharge lip. Product flows between the lip and the turning plate, turns over and is delivered onto the second conveyor.

The curved turning plate can be arranged to blend into a declined distribution plate to deliver the product stream across a width of the second conveyor. The curved turning plate and the declined distribution plate can be carried by the second conveyor to vibrate therewith, or can be carried by the first conveyor to be vibrated therewith. In either case the clearance or gap between the outlet of the first conveyor, particularly the edge of the discharge lip, and the curved turning plate can be adjusted to correspond to the size and shape of the particular product being conveyed to ensure a complete turning over of the product stream.

The second conveyor can include a discharge chute at an outlet thereof for feeding the thus coated product onto a weigh scale or onto a further conveyor or belt.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawings, and will be described herein in detail, a specific embodiment thereof with the understanding that the present disclosure is to be considered as an exemplification of the principles of the invention and is not intended to limit the invention to the specific embodiment illustrated.

Figure 1:
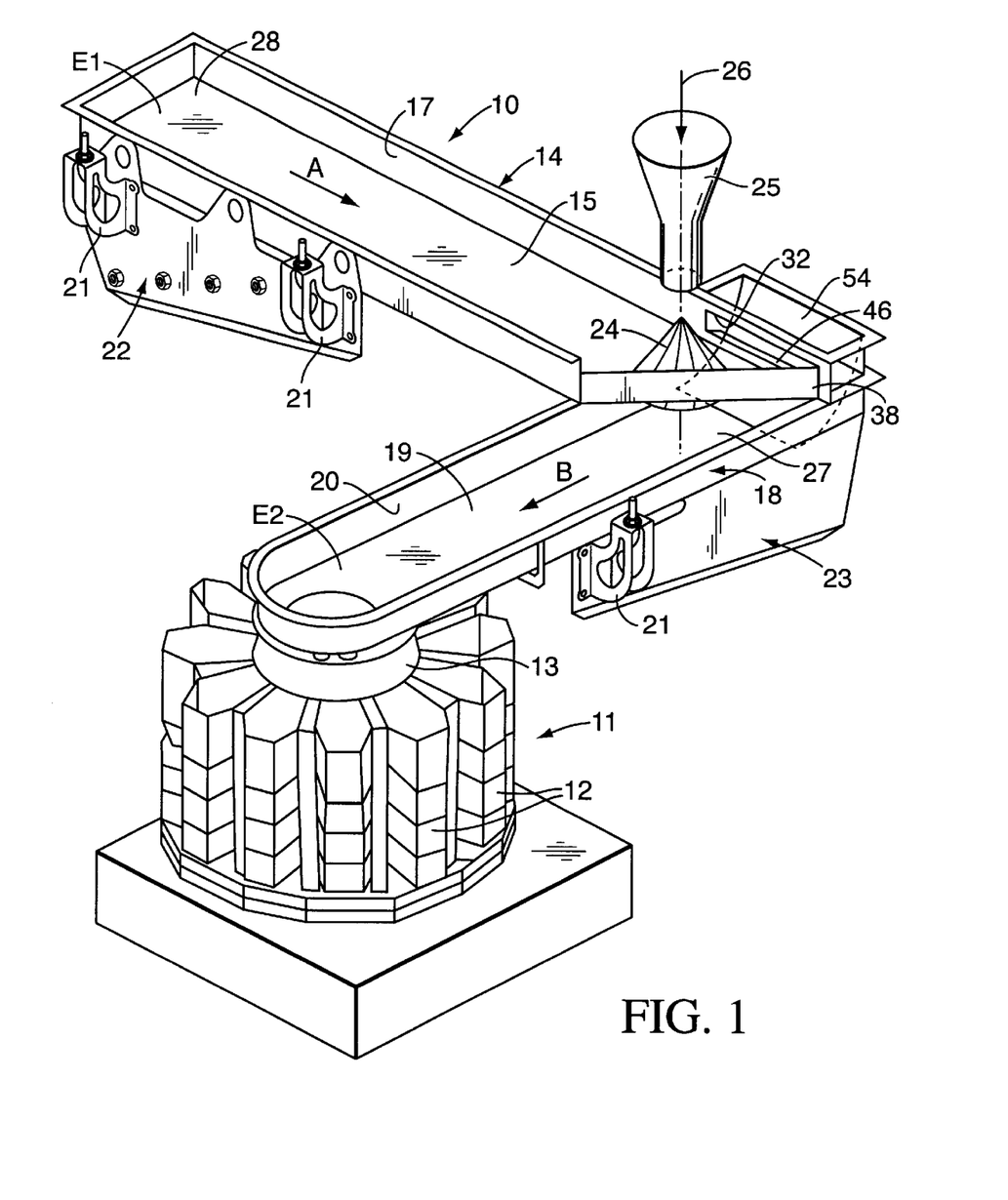
FIG. 1 is a diagrammatic perspective view of the present invention spreader apparatus arranged to feed a combination weighing machine.

FIG. 1 illustrates a spreader apparatus 10 arranged to treat and deliver a product stream, in the illustrated embodiment, to a combination weighing machine 11. The weighing machine 11 distributes product to circularly arranged weighing units 12 via a conical dispersion cone 13. The machine 11 weighs individual portions for packaging and sale. A weighing machine is more completely described for example in U.S. Pat. No. 5,054,652.

The apparatus 10 includes a first vibratory feeder or conveyor 14 having a conveying surface 15 at a first elevation E1, and a surrounding vertical wall 17. A second vibratory feeder or conveyor 18 has a conveying surface 19 at a second elevation E2, and a surrounding vertical wall 20. The conveyors 14, 18 preferably are arranged at 90° in plan, although other angles are possible and are encompassed by the invention.

The feeders 14, 18 are hung via support brackets 21. A few brackets 21 are shown but it is to be understood that sufficient brackets and supports are used to support the conveyors 14, 18.

The first conveyor 14 includes a drive assembly 22 for conveying material in a longitudinal direction A. The second feeder or conveyor 18 includes a vibratory drive assembly 23 for conveying materials in a longitudinal direction B.

A particle dispersing device, such as a cone 24, is elevated above the first and second surfaces 15, 19 over approximately a vertical overlap of the conveyors 14, 18. A delivery funnel 25 is arranged above the cone 24. Seasoning 26 is input into the funnel 25 and delivered onto the cone 24. The seasoning is distributed by the cone onto the product streams on both feeders 14, 18. The cone 24 can be vibrated to assist the even distribution of seasoning. The spreader cone 24 has a 360° circular discharge pattern as indicated by dashed circle C. A dispersing pattern of a 180° circular sector falls on a portion of the first conveyor 14, and a second dispersing pattern of a 180° circular sector falls on a portion of the second conveyor 18.

Figure 2:
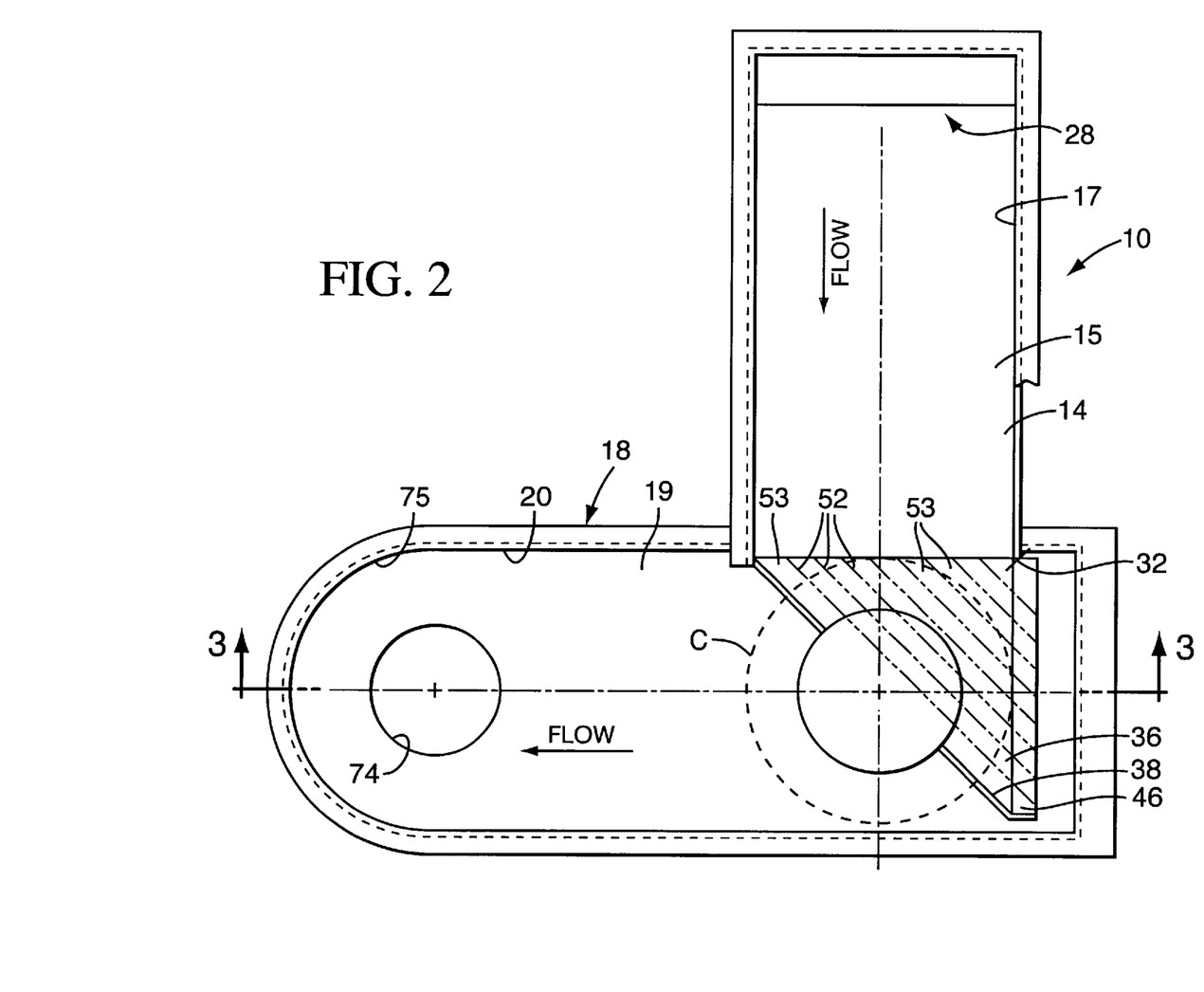
FIG. 2 is a plan view of a spreader apparatus according to the invention.
Figure 3:
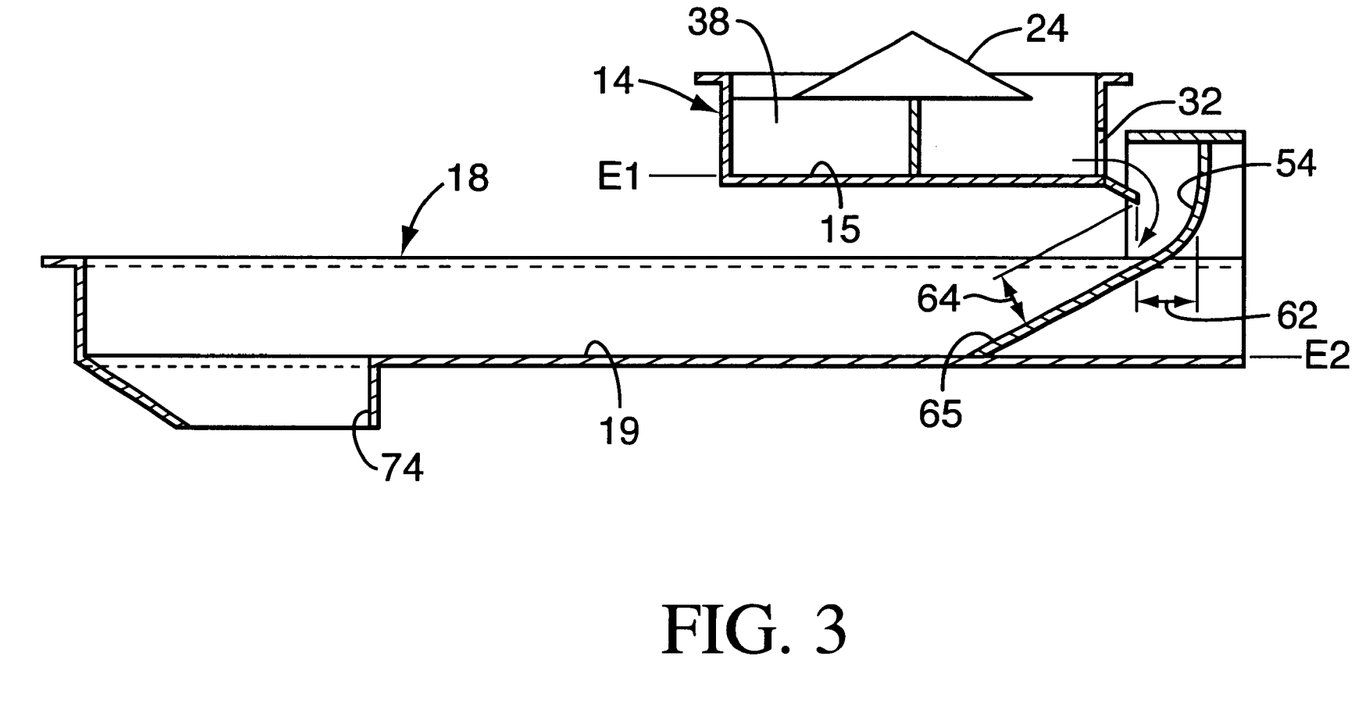
FIG. 3 is a sectional view taken generally along 3—3 of FIG. 2.

As illustrated in FIGS. 2 and 3, the first vibratory feeder 14 includes an inlet end 28 and a side outlet 32. A sloping transfer plate 36 can be sloped toward the side outlet 32. An angled vertical wall 38 directs longitudinal flow of the product on the feeder 14 toward the side outlet 32. A discharge lip 46 extends obliquely downwardly from the transfer plate 36. Although the transfer plate 36 is preferably sloped downwardly and the discharge lip 46 is preferably sloped downwardly from the transfer plate, the invention also encompasses the transfer plate and the discharge lip being substantially horizontal and/or substantially coplanar.

An arcuate turning wall 54 extends from a position spaced from the discharge lip 46 down to the second feeder 18. A horizontal gap 62 is arranged between the discharge lip 46 and the arcuate turning wall 54. A clearance 64 is arranged between the discharge lip 46 and the turning wall 54. The gap 62 and the clearance 64 can be adjusted to ensure that the product turns over 180° when passing from the discharge lip 46 onto the turning wall 54 and down to the second conveyor 18. The gap 62 and the clearance 64 can be adjusted by adjustment of the position of the conveyor 18. The arcuate turning wall 54 blends into a declined wall or plate 65 which continues down to the surface 19. The discharge lip supports the product stream during the first part of the product rotation, and the arcuate wall 54 and the declined plate 65 supports the product stream during the second half of its rotation.

The transfer plate 36 can be flat or sloped toward the lip 46. The lip 46 can be sloped or flat. The transfer plate 36 and/or the lip 46 can be provided with vertical, spaced-apart walls 52 which form lanes 53 which assist in maintaining orientation of the product flow throughout the transfer of the product to the turning wall 54.

The discharge lip 46 vibrates at the amplitude and frequency of the first conveyor 14, and the arcuate turning wall 54 and the declined wall 65 vibrate at the amplitude and frequency of the second conveyor 18. The respective amplitude of the first conveyor 14 and the second conveyor 18 are independently adjustable.

The second conveyor 18 has an outlet aperture or chute 74 and a semi-circular side wall portion 75 surrounding the aperture. The aperture 74 is arranged to deliver products from the second conveyor to the weighing machine 11, to a transfer belt or to another conveyor or to another station.

With a high percentage of second side exposure on the second conveyor, the coating quality on the second side is improved over existing methods. Additionally, by incorporating the device on the inlet side of the weighing machine 11, the product has reduced degradation due to reduced handling, compared to existing methods. The device is a compact apparatus for coating and turning a product stream. The apparatus can be incorporated into new and existing process lines with minimal cost.

Figure 4:
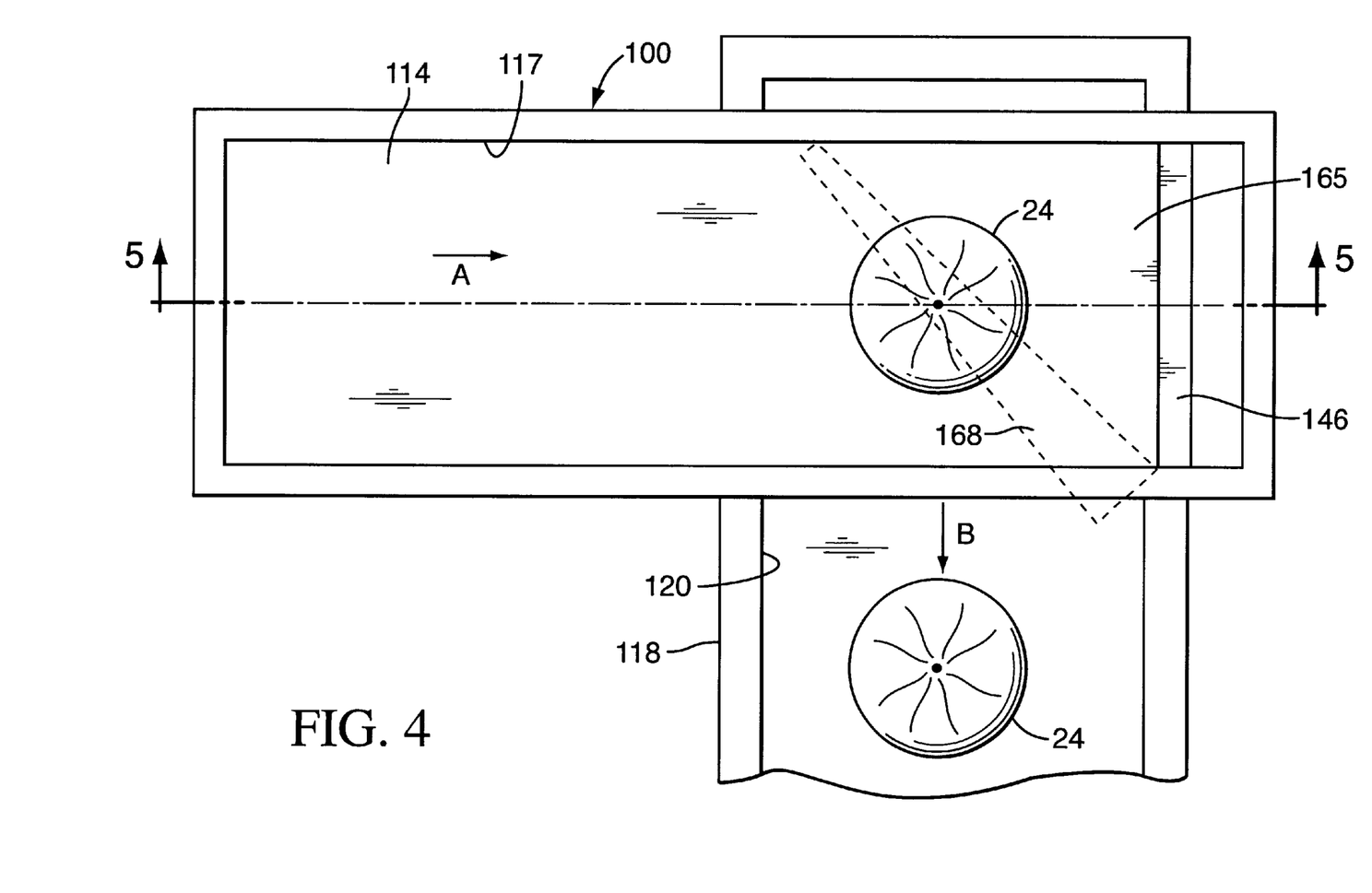
FIG. 4 is a plan view of an alternate spreader apparatus of the invention.
Figure 5:
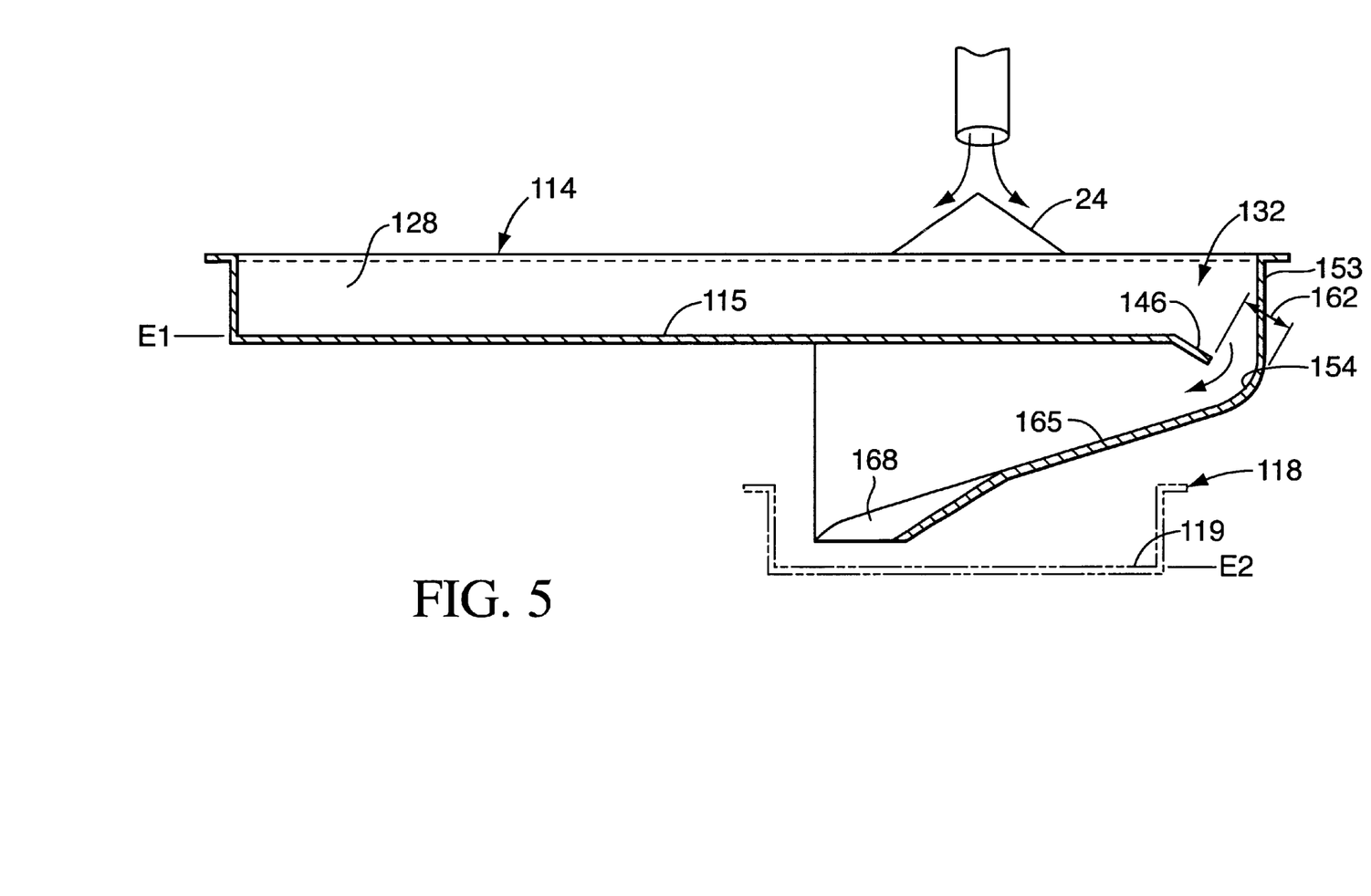
FIG. 5 is a sectional view taken generally along 5—5 of FIG. 4.

FIGS. 4 and 5 illustrate an alternate spreader apparatus 100 including a first vibratory feeder or conveyor 114 having a conveying surface 115 at a first elevation E1, and a surrounding wall 117. A second vibratory feeder or conveyor 118 has a conveying surface 119 at a second elevation E2, and a surrounding wall 120. The conveyors 114, 118 preferably are arranged at 90° in plan, although other angles are possible and encompassed by the invention. A particle dispersing device, such as dual spreader cones 24, is elevated above the first and second feeders 114, 118 at approximately a vertical overlap of the feeders 114, 118. The first vibratory feeder 114 includes an inlet end 128 and an outlet end 132. A discharge lip or transfer plate 146 extends from the conveyor floor 115 of the feeder 114. The transfer plate 146 can be flat or angled downwardly.

An end wall portion 153 of the surrounding wall 117 extends downwardly and blends into an arcuate turning wall 154 that is spaced from a distal end of the discharge lip 146, by a gap 162. The arcuate turning wall 154 blends into an oblique distribution plate 165. The turning wall 154 and the distribution plate 165 vibrate with the first conveyor 114. Product which is moved along the floor 115 of the first conveyor 114 is turned over when delivered between the discharge lip 146 and the arcuate turning wall 154. The oblique distribution plate 165 includes an angled distribution lip 168 which is turned downwardly at an oblique angle from the oblique distribution plate 165 and also angled across the width of the second conveyor 118. The arrangement of the distribution plate 165 and the distribution lip 168 are advantageously configured to distribute the product stream uniformly across the second conveyor 118.

The turning apparatus comprising the end wall portion 153, the arcuate wall 154, and the distribution plate 165 are adjusted, or made adjustable, with respect to the transfer plate 146, to adjust the gap 162. The gap 162 can be adjusted for the size and shape of the product being conveyed to ensure the turning-over of the product stream.

With a high percentage of the product stream moving along the conveyor having its second side exposed, the quality of treatment on the second side is greatly improved compared to current methods.

Figure 6:
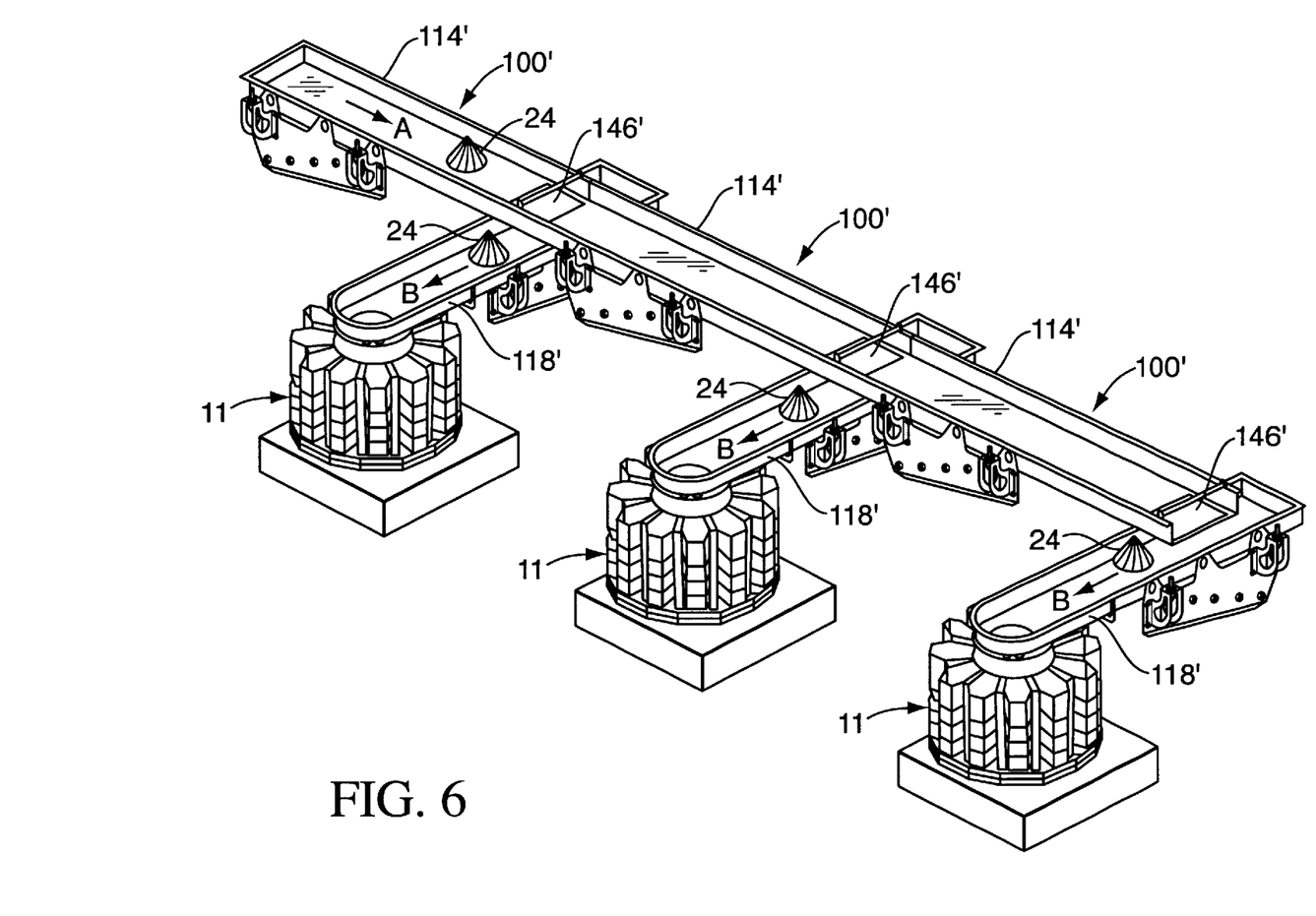
FIG. 6 is a diagrammatic perspective view of a product feed system incorporating the spreader apparatus of the invention.

FIG. 6 illustrates multiple spreading apparatus 100 installed at intermittent locations along the upper conveying surface of the vibratory feeder to withdraw, turn and discharge to multiple lines to multiple weighing machines 11. Discharge lips 146', such as described as item 146 in FIGS. 4 and 5, can be formed by adjustable gates. The gates can be partially opened to distribute specific volume to each weighing machine or can be cycled open and closed to distribute specific volume to each weighing machine. Below the lips 146' are the arcuate turning walls 154 and distribution plates 165 as shown in FIG. 5. A sufficient number of cones 24, or other dispensing devices, are arranged over first conveyors 114' and second conveyors 118' to treat both sides of the product steam with particles. The particle funnels 25 are not shown for simplicity of depiction.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A spreader apparatus for dispensing particles on a stream of articles comprising:
   a first conveyor having a first inlet and a first outlet;
   a second conveyor arranged below said first conveyor and having a second inlet in product flow communication with said first outlet of said first conveyor, and a second outlet;
   a particle dispensing device arranged above said first and second conveyors and configured to dispense particles onto said article stream carried on said first and second conveyors; and
   a turning apparatus arranged adjacent to said first outlet, and configured to return the article stream over by gravity about 180 degrees as the article stream is entering said second conveyor, said turning apparatus comprising a curved turning wall which receives said article stream by gravity from said first outlet of said first conveyor.

2. The spreader apparatus according to claim 1, wherein said turning apparatus comprises a declined discharge lip, said curved turning wall being spaced from said discharge lip.

3. The spreader apparatus according to claim 1, wherein said particle dispensing device comprises a spreader cone, arranged to disperse particles over a 180° circular sector pattern onto the article stream carried on said first conveyor, and to disperse particles over a 180° circular sector pattern onto the article stream conveyed on said second conveyor.

4. The spreader apparatus according to claim 1, wherein said first conveyor includes a declined conveying surface adjacent to said first outlet.

5. The spreader apparatus according to claim 1, wherein said particle dispensing device is configured to dispense seasoning, and said conveyors are configured to convey food product.

6. A spreader apparatus for dispensing particles on a stream of articles, comprising:
   a first conveyor having a first outlet;
   a second conveyor arranged below said first conveyor but at least partially vertically offset, and having a second inlet in article flow communication, by gravity, with said first outlet of said first conveyor, and a second outlet; and
   a particle dispensing device arranged above both said first and second conveyors and configured to simultaneously dispense particles onto said article stream carried on both said first and second conveyors, said particle dispensing device comprising a spreader cone arranged to disperse particles over a sector pattern onto the article stream carried on said first conveyor, and to disperse particles over another sector pattern onto the article stream conveyed on said second conveyor.

7. The spreader apparatus according to claim 6, comprising a turning wall assembly arranged adjacent to said first outlet, said turning wall assembly configured to turn the article stream over about 180 degrees as the article stream is delivered from said first outlet to said second inlet.

8. A conveying apparatus for a stream of articles, comprising:
   a first conveyor having a first inlet and a first outlet;
   a second conveyor arranged below said first conveyor and having a second inlet in product flow communication with said first outlet of said first conveyor, and a second outlet; and
   a turning apparatus arranged adjacent to said first outlet, and configured to turn the article stream over, by gravity, about 180 degrees and as the article stream is entering said second conveyor, said turning apparatus comprising a curved turning wall which receives said article stream by gravity from said first outlet of said first conveyor.

9. The conveying apparatus according to claim 8, wherein said turning apparatus comprises a declined discharge lip, said curved turning wall being spaced from said discharge lip.

10. The conveying apparatus according to claim 8, further comprising a material dispensing device arranged above said first and second conveyors and configured to dispense material onto said article stream carried on said first and second conveyors; and wherein said material dispensing device comprises a spreader cone, arranged to disperse material over a 180° circular sector pattern onto the article stream carried on said first conveyor, and to disperse material over a 180° circular sector pattern onto the article stream conveyed on said second conveyor.

11. The conveying apparatus according to claim 8, wherein said first conveyor includes a declined conveying surface adjacent to said first outlet.

12. The conveying apparatus according to claim 8, further comprising a material dispensing device arranged above said first and second conveyors and configured to dispense material onto said article stream carried on said first and second conveyors.

13. The conveying apparatus according to claim 12, wherein said material dispensing device is configured to dispense seasoning, and said conveyors are configured to convey food product.

14. A spreader apparatus for dispensing particles on a stream of articles, comprising:
   a first conveyor having a first inlet and a first outlet;
   a second conveyor arranged below said first conveyor and having a second inlet in product flow communication with said first outlet of said first conveyor, and a second outlet;
   a particle dispensing device arranged above said first and second conveyors and configured to dispense particles onto said article stream carried on said first and second conveyors; and
   a turning apparatus arranged adjacent to said first outlet, and configured to turn the article stream over about 180 degrees as the article stream is entering said second conveyor, wherein said turning apparatus comprises a declined discharge lip and a curved turning wall spaced from said discharge lip, and
   wherein said first outlet comprises a side outlet, and said first conveyor comprises an angled vertical wall directing longitudinal flow of the article stream on said first conveyor toward said side outlet.

15. A spreader apparatus for dispensing particles on a stream of articles, comprising:
   a first conveyor having a first inlet and a first outlet;
   a second conveyor arranged below said conveyor and having a second inlet in product flow communication with said first outlet of said first conveyor, and a second outlet;
   a particle dispensing device arranged above said first and second conveyors and configured to dispense particles onto said article stream carried on said first and second conveyors; and
   a turning apparatus arranged adjacent to said first outlet, and configured to turn the article stream over about 180 degrees as the article stream is entering said second conveyor, wherein said second outlet comprises an aperture surrounded in part by a semi-circular, vertical wall arranged to direct the article stream flow into said aperture.

16. A spreader apparatus for dispensing particles on a stream of articles, comprising:

a first conveyor having a first outlet;

a second conveyor arranged below said first conveyor but at least partially vertically offset, and having a second inlet in article flow communication with said outlet of said first conveyor, and a second outlet;

a particle dispensing device arranged above both said first and second conveyors and configured to dispense particles onto said article stream carried on both said first and second conveyors; and a turning wall assembly arranged adjacent to said first outlet, said turning wall assembly configured to turn the article stream over about 180 degrees as the article stream is delivered from said first outlet to said second inlet, wherein said turning wall assembly comprises an arcuate wall and an angled discharge lip spaced by a clearance to said arcuate wall, and an angular delivery floor extending from said arcuate wall down to a position adjacent a floor of said second conveyor.

17. A conveying apparatus for a stream of articles, comprising:

a first conveyor having a first inlet and a first outlet;

a second conveyor arranged below said first conveyor and having a second inlet in product flow communication with said first outlet of said first conveyor, and a second outlet; and a turning apparatus arranged adjacent to said first outlet, and configured to turn the article stream over about 180 degrees as the article stream is entering said second conveyor, wherein said turning apparatus comprises a declined discharge lip and a curved turning wall spaced from said discharge lip, said first outlet comprising a side outlet, and said first conveyor comprising an angled vertical wall directing longitudinal flow of the article stream on said first conveyor toward said side outlet.

* * * * *